(12) United States Patent
Bradbury et al.

(10) Patent No.: US 9,772,867 B2
(45) Date of Patent: Sep. 26, 2017

(54) CONTROL AREA FOR MANAGING MULTIPLE THREADS IN A COMPUTER

(71) Applicant: International Business Machines Corporation, Armonk, NY (US)

(72) Inventors: Jonathan D. Bradbury, Poughkeepsie, NY (US); Fadi Y. Busaba, Poughkeepsie, NY (US); Mark S. Farrell, Pleasant Valley, NY (US); Charles W. Gainey, Jr., Poughkeepsie, NY (US); Dan F. Greiner, San Jose, CA (US); Lisa Cranton Heller, Rhinebeck, NY (US); Jeffrey P. Kubala, Poughquag, NY (US); Damian L. Osisek, Vestal, NY (US); Donald W. Schmidt, Stone Ridge, NY (US); Timothy J. Slegel, Staatsburg, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 175 days.

(21) Appl. No.: 14/226,986

(22) Filed: Mar. 27, 2014

(65) Prior Publication Data
US 2015/0277948 A1   Oct. 1, 2015

(51) Int. Cl.
G06F 9/455   (2006.01)
G06F 9/50    (2006.01)

(52) U.S. Cl.
CPC ...... *G06F 9/45558* (2013.01); *G06F 9/45533* (2013.01); *G06F 9/5077* (2013.01); *G06F 2009/45583* (2013.01)

(58) Field of Classification Search
None
See application file for complete search history.

(56) References Cited

U.S. PATENT DOCUMENTS 4,253,145 A  *  2/1981  Goldberg ............ G06F 9/45558
                                                              703/21
4,456,954 A      6/1984  Bullions, III et al.
(Continued)

FOREIGN PATENT DOCUMENTS

CN    102193779 A    9/2011
CN    102866957 A    1/2013
(Continued)

OTHER PUBLICATIONS

Martin Baumi, "Hardware Virtualization Support for Afterburner/L4", Mar. 4, 2007, pp. 1-27.
(Continued)

*Primary Examiner* — Shih-Wei Kraft
(74) *Attorney, Agent, or Firm* — Cantor Colburn LLP

(57) ABSTRACT

Embodiments relate to a control area for managing multiple threads in a computer. An aspect is a computer system that includes a virtual machine (VM) configuration with one or more cores. Each core is enabled to operate in a single thread (ST) mode or a multithreading (MT) mode. The ST mode consists of a single thread and the MT mode consists of a plurality of threads on shared resources of a respective core. The computer system includes a core-oriented system control area (COSCA) having a common area representing all of the cores of the VM configuration and separate core description areas for each of the cores in the VM configuration. Each core description area indicates a location of one or more thread description areas each representing a thread within the respective core, and each thread description area indicates a location of a state description of the respective thread.

10 Claims, 12 Drawing Sheets

(56) References Cited

U.S. PATENT DOCUMENTS

| | | | |
|---|---|---|---|
| 4,564,903 A * | 1/1986 | Guyette | G06F 9/4843 |
| | | | 711/147 |
| 4,777,594 A | 10/1988 | Jones et al. | |
| 4,792,895 A | 12/1988 | Tallman | |
| 4,816,991 A | 3/1989 | Watanabe et al. | |
| 5,317,754 A | 5/1994 | Blandy et al. | |
| 5,437,033 A | 7/1995 | Inoue et al. | |
| 5,485,626 A | 1/1996 | Lawlor et al. | |
| 6,269,391 B1 * | 7/2001 | Gillespie | G06F 9/4881 |
| | | | 718/100 |
| 6,349,365 B1 | 2/2002 | McBride | |
| 6,735,758 B1 * | 5/2004 | Berry | G06F 11/3404 |
| | | | 714/E11.192 |
| 6,854,114 B1 | 2/2005 | Sexton et al. | |
| 7,502,884 B1 | 3/2009 | Shah | |
| 7,526,421 B2 | 4/2009 | Deitch | |
| 7,694,304 B2 | 4/2010 | Kissell | |
| 7,698,540 B2 | 4/2010 | Norton et al. | |
| 7,849,297 B2 | 12/2010 | Kissell | |
| 7,873,776 B2 | 1/2011 | Hetherington et al. | |
| 8,091,086 B1 | 1/2012 | Ershov et al. | |
| 8,141,098 B2 | 3/2012 | Bradford et al. | |
| 8,301,815 B2 | 10/2012 | Farrell et al. | |
| 8,356,143 B1 | 1/2013 | Bulusu et al. | |
| 8,589,922 B2 | 11/2013 | Adar et al. | |
| 8,621,459 B2 | 12/2013 | Levit-Gurevich et al. | |
| 8,725,485 B2 | 5/2014 | Tatsuoka et al. | |
| 2002/0069335 A1 | 6/2002 | Flylnn, Jr. | |
| 2002/0124241 A1 | 9/2002 | Grey et al. | |
| 2004/0117539 A1 * | 6/2004 | Bennett | G06F 9/45558 |
| | | | 711/6 |
| 2004/0128448 A1 | 7/2004 | Stark et al. | |
| 2004/0215932 A1 | 10/2004 | Burky et al. | |
| 2004/0230976 A1 | 11/2004 | Slegel et al. | |
| 2004/0236562 A1 | 11/2004 | Beckmann | |
| 2005/0246718 A1 * | 11/2005 | Erlingsson | G06F 9/4411 |
| | | | 719/317 |
| 2006/0005188 A1 | 1/2006 | Vega et al. | |
| 2006/0174053 A1 * | 8/2006 | Anderson | G06F 9/45537 |
| | | | 711/6 |
| 2006/0212840 A1 * | 9/2006 | Kumamoto | G06F 9/461 |
| | | | 717/100 |
| 2006/0242389 A1 | 10/2006 | Browning et al. | |
| 2006/0242643 A1 | 10/2006 | Belmar et al. | |
| 2007/0028238 A1 * | 2/2007 | Bennett | G06F 9/45558 |
| | | | 718/1 |
| 2007/0136721 A1 * | 6/2007 | Dunshea | G06F 9/5077 |
| | | | 717/174 |
| 2007/0234284 A1 | 10/2007 | Tanner et al. | |
| 2007/0300227 A1 * | 12/2007 | Mall | G06F 9/3851 |
| | | | 718/102 |
| 2008/0155536 A1 | 6/2008 | Levit-Gurevich et al. | |
| 2008/0184240 A1 | 7/2008 | Franaszek | |
| 2008/0288941 A1 * | 11/2008 | Adams | G06F 9/45533 |
| | | | 718/1 |
| 2009/0007112 A1 * | 1/2009 | Moriki | G06F 9/45545 |
| | | | 718/1 |
| 2009/0100424 A1 | 4/2009 | Otte et al. | |
| 2009/0217264 A1 * | 8/2009 | Heller | G06F 9/45558 |
| | | | 718/1 |
| 2010/0235847 A1 | 9/2010 | Brehmer et al. | |
| 2011/0265068 A1 | 10/2011 | Elnozahy et al. | |
| 2012/0311270 A1 | 12/2012 | Sun et al. | |
| 2013/0024871 A1 | 1/2013 | Gao et al. | |
| 2013/0111453 A1 | 5/2013 | Kalogeropulos et al. | |
| 2013/0185738 A1 | 7/2013 | Farrell et al. | |
| 2013/0185739 A1 | 7/2013 | Farrell et al. | |
| 2013/0191824 A1 | 7/2013 | Muff et al. | |
| 2013/0191832 A1 | 7/2013 | Busaba et al. | |
| 2013/0305023 A1 | 11/2013 | Gainey, Jr. et al. | |
| 2014/0337848 A1 | 11/2014 | Llamas et al. | |
| 2015/0212845 A1 | 7/2015 | Tsirkin | |
| 2015/0212846 A1 | 7/2015 | Tsirkin | |

FOREIGN PATENT DOCUMENTS

| | | |
|---|---|---|
| EP | 0067344 A2 | 12/1982 |
| EP | 0145960 A2 | 6/1985 |
| EP | 1182567 A1 | 2/2002 |
| EP | 2704050 A1 | 5/2014 |
| WO | 9313482 A1 | 7/1993 |
| WO | 2009101563 | 8/2009 |

OTHER PUBLICATIONS

P.H. Gum, "System/370 Extended Architecture: Facilities for Virtual Machines", IBM J. Res. Develop, vol. 27, No. 6, Nov. 1983; 15 pages.

U.S. Appl. No. 14/226,955; Notice of Allowance; Date Filed: Mar. 27, 2014; Date Mailed: Jul. 9, 2015; 26 pages.

U.S. Appl. No. 14/226,967, Notice of Allowance, Date Filed: Mar. 27, 2014; Date Mailed: Jul. 30, 2015; 22 pages.

U.S. Appl. No. 14/227,003; Notice of Allowance, Date Filed: Mar. 27, 2014; Date Mailed: Aug. 19, 2015; 29 pages.

UK International Search Report and Written Opinion for International Application No. PCT/EP2015/054731; International Filing Date: Mar. 6, 2015; Date of Mailing Jun. 29, 2015; 12 pages.

UK International Search Report and Written Opinion for International Application No. PCT/EP2015/055442; International Filing Date: Mar. 16, 2015; Date of Mailing: Jul. 7, 2015; 11 pages.

UK International Search Report and Written Opioinion for International Application No. PCT/EP2015/055942; International Filing Date: Mar. 20, 2015; Date of Mailing Jun. 30, 2015 13 pages.

F. Busaba, et al., "Exiting Multiple Threads in a Computer," U.S. Appl. No. 14/226,967, filed Mar. 27, 2014.

Fedorova, Alexandra, et al. "Cypress: A scheduling infrastructure for a many-core hypervisor." Proceedings of the 1st Workshop on Managed Many-Core Systems, Boston, MA, USA. 2008, 7 pages.

J. Bradbury, et al., "Start Virtual Execution Instruction for Dispatching Multiple Threads in a Computer," U.S. Appl. No. 14/227,003, filed Mar. 27, 2014.

UK International Search Report and Written Opinion for International Application No. PCT/EP2015/054741; International Filing Date: Mar. 6, 2015; Date of Mailing: Jun. 9, 2015; 9 pages.

Cho, Chang-Burm, et al; "Accurate, scalable and informative design space exploration for large and sophisticated multi-core oriented architectures." In Modeling, Analysis & Simulation of Computer and Telecommunication Systems, 2009. MASCOTS'09. IEEE International Symposium on, pp. 1-10. IEEE, 2009, 10 pages.

Hauck, Franz J., et al; "The COSCA PaaS platform: on the way to flexible and dependable cloud computing." In Proceedings of the 1st European Workshop on Dependable Cloud Computing, p. 1. ACM, 2012., 2 pages.

Stetter et al., "IBM eServer z990 Improvements in firmware simulation," IBM 2004, pp. 583-594.

Zucker et al., "An Automated Method for Software Controlled Cache Prefetchin", 1998 IEEE, 9 pages.

"zArchitecture Principles of Operation," Tenth Edition, Sep. 2012, Publication No. SA22-7832-09, copyright IBM Corp., 886 pages.

Collins et al., "Speculative Precomputation: Long-range Prefetching of Delinquent Loads" ACM Sigarch Computer Architecture News, vol. 29., No. 2, ACM, 2001, pp. 14-25.

Mehner, "JaVis: A UML-Based Visualization and Debugging Environment for Concurrent Java Programs", Software Visualization, Springer Berlin Heideberg, 2002, pp. 163,175.

Sevcik et al., "Relaxed-Memory Concurrency and Verified Compilation", ACM Sigplan Notices, vol. 46, No. 1, ACM, 2011, pp. 43-54.

* cited by examiner

CONTROL AREA FOR MANAGING MULTIPLE THREADS IN A COMPUTER

BACKGROUND

The present invention relates generally to multithreading (MT), and more specifically, to a core-oriented system control area (COSCA) for managing multiple threads in a computer.

Multithreading (MT) provides a means for increasing the number of processor threads that can operate in parallel within a single physical processor core without the need to add additional cores. Ideally, MT provides this increased capacity by having one or more threads use portions of the core hardware that are currently not being used by the other thread(s) running on the same core. For example, during the latency caused by a cache-miss or other delay in one thread, one or more other threads can utilize the core resources, thus increasing the utilization of the resources. Even though in practice, this sharing results in some interference between the threads and requires some additional hardware, MT still provides the ability to perform each thread's work using less hardware then would be required if each thread were to run on its own isolated core hardware. Often, additional benefit can be derived from MT when the sharing of hardware resources between threads also decreases the overall strain on the computer system to provide information, such as data from memory, to two unique cores.

Typically, although MT provides hardware savings, the addition of another work thread consumes the same coordination cost at the hypervisor level that would be required to provide increased capacity using an additional, separate core. In many instances, once a certain scaling ratio is achieved, the overhead to coordinate resources between work threads, whether run on a single or shared core, is substantial and can decrease or even outweigh the benefits seen by the ability to run an independent work thread. That is, in general there is more management overhead as the number of things to manage increases.

SUMMARY

Embodiments include a system, method, and computer program product for providing a control area for managing multiple threads in a computer. According to one aspect, a computer system includes a virtual machine (VM) configuration having one or more cores, where each core is enabled to operate in a single thread (ST) mode or a multithreading (MT) mode. The ST mode consists of a single thread and the MT mode consists of a plurality of threads on shared resources of a respective core. The computer system also includes a core-oriented system control area (COSCA) having a common area representing all of the one or more cores of the VM configuration and separate core description areas for each core of the one or more cores in the VM configuration. Each core description area indicates a location of one or more thread description areas each representing a thread within the respective core, and each thread description area indicates a location of a state description of the respective thread. The computer system further includes a facility configured to control the configuration to perform a method. The method includes managing threads of the one or more cores of the VM configuration based on contents of the COSCA.

According to another aspect, a computer-implemented method for managing multiple threads in a virtual machine (VM) configuration is provided. The configuration includes one or more cores, where each core is enabled to operate in a single thread (ST) mode or a multithreading (MT) mode. The ST mode consists of a single thread and the MT mode consists of a plurality of threads on shared resources of a respective core. The method includes providing a core-oriented system control area (COSCA) having a common area representing all of the one or more cores of the VM configuration and separate core description areas for each core of the one or more cores in the VM configuration. Each core description area indicates a location of one or more thread description areas each representing a thread within the respective core, and each thread description area indicates a location of a state description of the respective thread. The method further includes managing, by a core, threads of the one or more cores of the VM configuration based on contents of the COSCA.

A further aspect includes a computer program product for managing multiple threads in a virtual machine (VM) configuration. The configuration includes one or more cores, where each core is enabled to operate in a single thread (ST) mode or a multithreading (MT) mode. The ST mode consists of a single thread and the MT mode consists of a plurality of threads on shared resources of a respective core. The computer program product includes a computer readable storage medium having program instructions embodied therewith, wherein the computer readable storage medium is not a signal, the program instructions readable by a processing circuit to cause the processing circuit to perform a method. The method includes providing a core-oriented system control area (COSCA) having a common area representing all of the one or more cores of the VM configuration and separate core description areas for each core of the one or more cores in the VM configuration. Each core description area indicates a location of one or more thread description areas each representing a thread within the respective core, and each thread description area indicates a location of a state description of the respective thread. The method also includes managing, by a core, threads of the one or more cores of the VM configuration based on contents of the COSCA.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Figure 1:
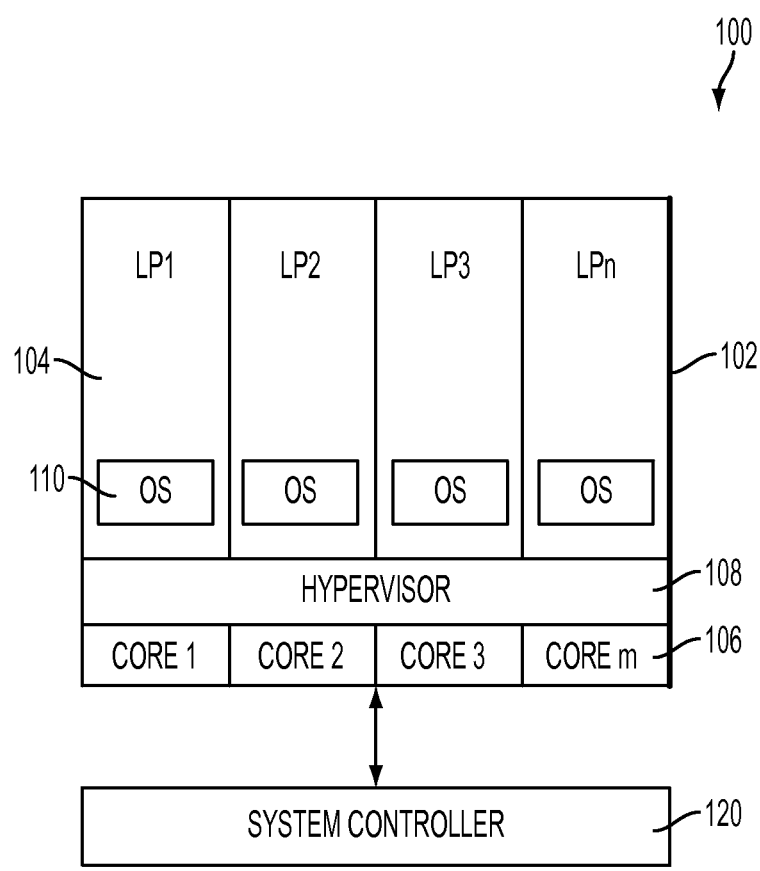
FIG. 1 depicts a computing environment that may be implemented in accordance with an embodiment.

Embodiments described herein can be utilized to reduce hypervisor management overhead in a multithreading (MT) environment. As described herein, the management of multiple threads can be split between a hypervisor that manages the multiple threads as a single logical core, and a machine that manages interactions between the multiple threads as they access resources of the physical core. This can result in substantially reducing multithreading (MT) overhead costs by allowing the hypervisor to manage much of the hypervisor infrastructure resources on a logical core basis, and to allow the machine to manage other resources on a more granular, thread basis. An embodiment includes a core dispatch instruction that can be executed by a hypervisor that is running on a single thread (ST). Execution of the core dispatch instruction, referred to herein as a "start-VE instruction with MT specified", can cause multiple guest logical threads that make up all or a portion of a guest virtual machine (VM) to be dispatched on a single physical core. In an embodiment, the instruction used by the hypervisor to dispatch the guest specifies whether the guest to be dispatched is single-threaded or multithreaded.

Embodiments described herein can include structures, such as a thread-validity mask for indicating which logical threads within a guest logical core are currently valid and a state description group that includes a state description ring, for managing the dispatch of a multithreaded logical core. In addition, primary and secondary state descriptions and field types (e.g., primary, core-common, thread specific) can be implemented to allow for the efficient management of the computer resources when a logical core with multiple threads is dispatched. Further, a coordinated exit where all threads within a logical core exit virtual-execution at the same time can be provided to simplify both hypervisor and logical core management functions.

Embodiments can include a control structure maintained by the hypervisor that is referred to herein as a core oriented system control area (COSCA). The COSCA is used by both the hypervisor and the machine to manage certain functions which may affect multiple logical processors in the guest configuration. An embodiment of the COSCA is implemented as a tree structure where the leaves represent logical cores and each leaf contains a list corresponding to the threads of that core. The COSCA structure can contain fields (e.g., state description addresses) that allow the hypervisor to easily access the state descriptions for all of the threads in a particular core.

As used herein, the term "thread" refers to a single instruction stream and its associated state. That is, at an architecture level, each logical thread represents an independent CPU or processor. At a hardware level, a physical thread is the execution of an instruction stream associated with a logical thread, combined with the maintaining of that guest state, when that thread is dispatched. It is the maintaining of that thread state by the machine that reduces the management required at the hypervisor level. The total number of logical threads available for use by logical cores is limited by the total number of physical threads available to the physical cores.

As used herein, the term "physical core" refers to a hardware processing unit that executes one or more independent instruction streams or threads but shares many base resources such as execution units and low-level caches. This sharing can be done a number of ways including by having each thread use the same hardware resources at independent times or by having the resources be logically shared with each physical entry tagged with a thread identifier. Proper synergy between the threads, for example one thread that needs resource A often but resource B only rarely and another thread that typically uses resource B but not resource A, can improve the efficiency of this sharing. As used herein, the term "machine" refers to hardware included in the physical core as well as millicode and other hardware used in support of the physical core.

As used herein, the terms "guest VM" and "guest" are used interchangeably to refer to a single guest configuration which can include a single CPU or multiple CPUs. As used herein, the term "logical core" refers to a group of logical guest threads or CPUs that are defined to be dispatched together as part of a start-VE instruction where MT is specified. A guest VM can be made up of a single logical core (either ST or MT) or multiple logical cores (also each of which can be ST or MT).

As used herein, the term "software" refers to either the hypervisor program (e.g. PR/SM or zVM) or the guest operating system or application program which is dispatched as a result of the start-VE instruction.

As used herein, the terms "hypervisor" and "host" refer to the program which manages the system resources and dispatches the guest logical processor(s) to run on the physical hardware.

Figure 12:
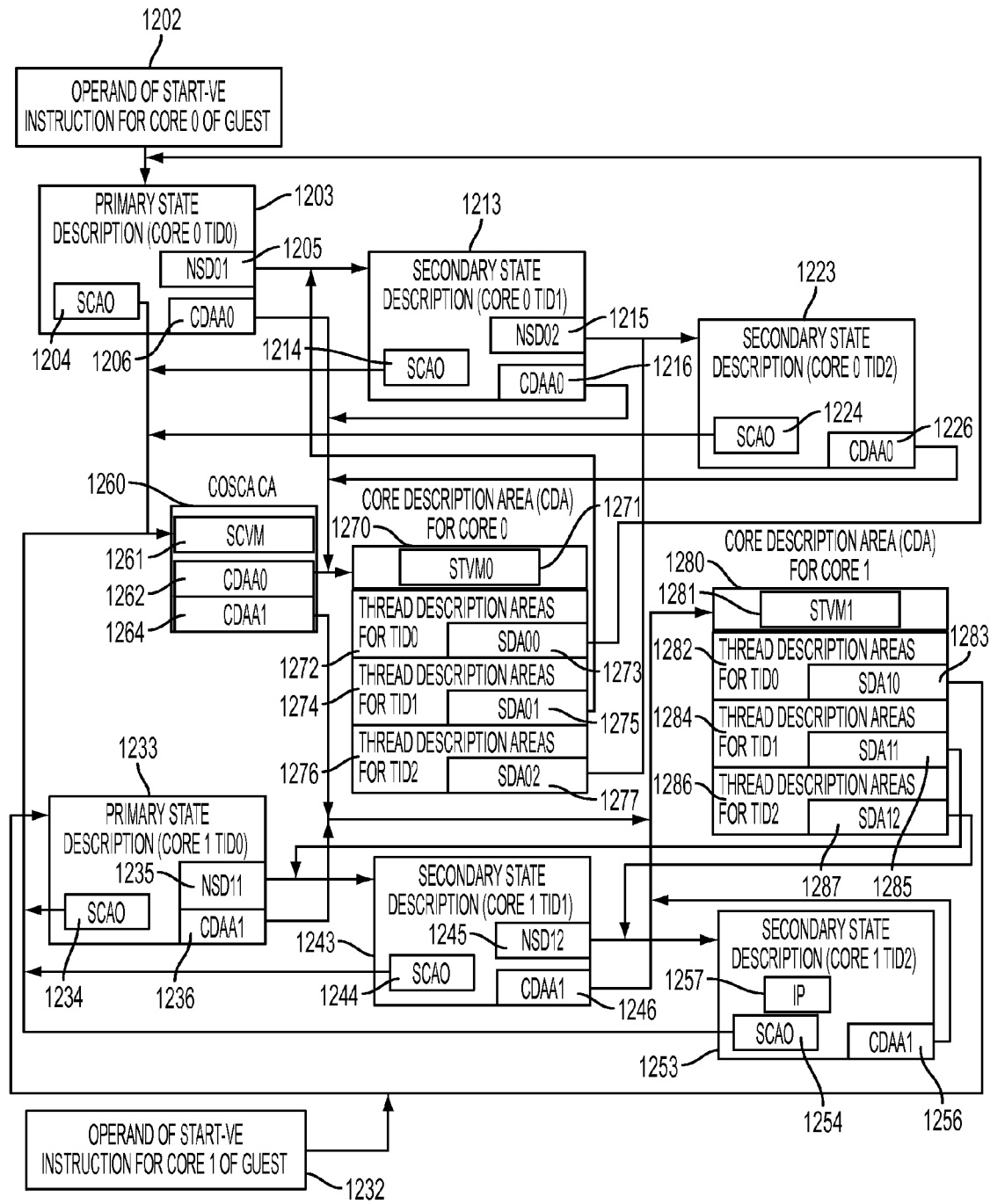
FIG. 12 depicts a block diagram of a system control area in accordance with an embodiment.

The operand of the start-VE instruction used to dispatch a guest points to a state description or group of state descriptions which defines the state of that guest processor or core. The state description itself has pointers to "satellite blocks" which can be viewed as an extension to the state description and include additional information which further defines the state of that guest core or processor. As used herein, the term "state description" refers not only to the state description itself but also to those satellite blocks. The core-oriented system control area (COSCA), one of these satellite blocks, is depicted in FIG. 12.

Turning now to FIG. 1, a computing environment 100 that may be implemented by an exemplary embodiment is generally shown. Computing environment 100 can be based, for example, on the z/Architecture offered by International Business Machines Corporation, Armonk, N.Y. The z/Architecture is described in an IBM® publication entitled, "z/Architecture Principles of Operation," IBM Publication No. SA22-7832-09, August 2012, which is hereby incorporated herein by reference in its entirety. In one example, a computing environment based on the z/Architecture includes an eServer zSeries, offered by International Business Machines Corporation, Armonk, N.Y.

As one example, computing environment 100 can include a processor complex 102 coupled to a system controller 120. Processor complex 102 can include, for example, one or more partitions 104 (e.g., logical partitions LP1-LPn), one or more physical cores 106 (e.g., Core 1-Core m), and a level-0 hypervisor 108 (e.g., a logical partition manager), each of which is described below.

Each logical partition 104 can be capable of functioning as a separate system. That is, each logical partition 104 can be independently reset, initially loaded with an operating system 110, if desired, and operate with different programs. An operating system 110 or application program running in a logical partition 104 can appear to have access to a full and complete system, but in reality, only a portion of it is available. A combination of hardware and Licensed Internal Code (commonly referred to as microcode or millicode or firmware) keeps a program in one logical partition 104 from interfering with a program in a different logical partition 104. This allows several different logical partitions 104 to operate on a single or multiple physical cores 106 in a time sliced manner. In an embodiment, each physical core includes one or more central processors (also referred to herein as "physical threads"). In the example shown in FIG. 1, each logical partition 104 has a resident operating system 110, which may differ for one or more logical partitions 104. The operation system 110 running in each logical partition 104 is an example of a virtual machine or guest configuration. In one embodiment, operating system 110 is the z/OS® operating system, offered by International Business Machines Corporation, Armonk, N.Y.

Physical cores 106 include physical processor resources that are allocated to the logical partitions 104. A logical partition 104 can include one or more logical processors, each of which represents all or a share of the physical processor resources allocated to the partition 104. The physical cores 106 may be either dedicated to the logical cores of a particular partition 104, so that physical processor resources of the underlying core(s) 106 are reserved for that partition 104; or shared with the logical cores of another partition 104, so that physical processor resources of the underlying core(s) resources are potentially available to another partition 104.

In the embodiment shown in FIG. 1, the logical partitions 104 are managed by level-0 hypervisor 108 which is implemented by firmware running on physical cores 106. Logical partitions 104 and hypervisor 108 each comprise one or more programs residing in respective portions of central storage (memory) associated with the physical cores 106. One example of hypervisor 108 is the Processor Resource/Systems Manager (PR/SM™), offered by International Business Machines Corporation, Armonk, N.Y.

System controller 120, which in FIG. 1 is coupled to the central processor complex 102, can include centralized logic responsible for arbitrating between different processors issuing requests. For instance, when system controller 120 receives a memory access request, it determines if access to that memory location is allowed and, if so, provides the contents of that memory location to the central processor complex 102 while maintaining memory consistency between processors within that complex.

Figure 2:
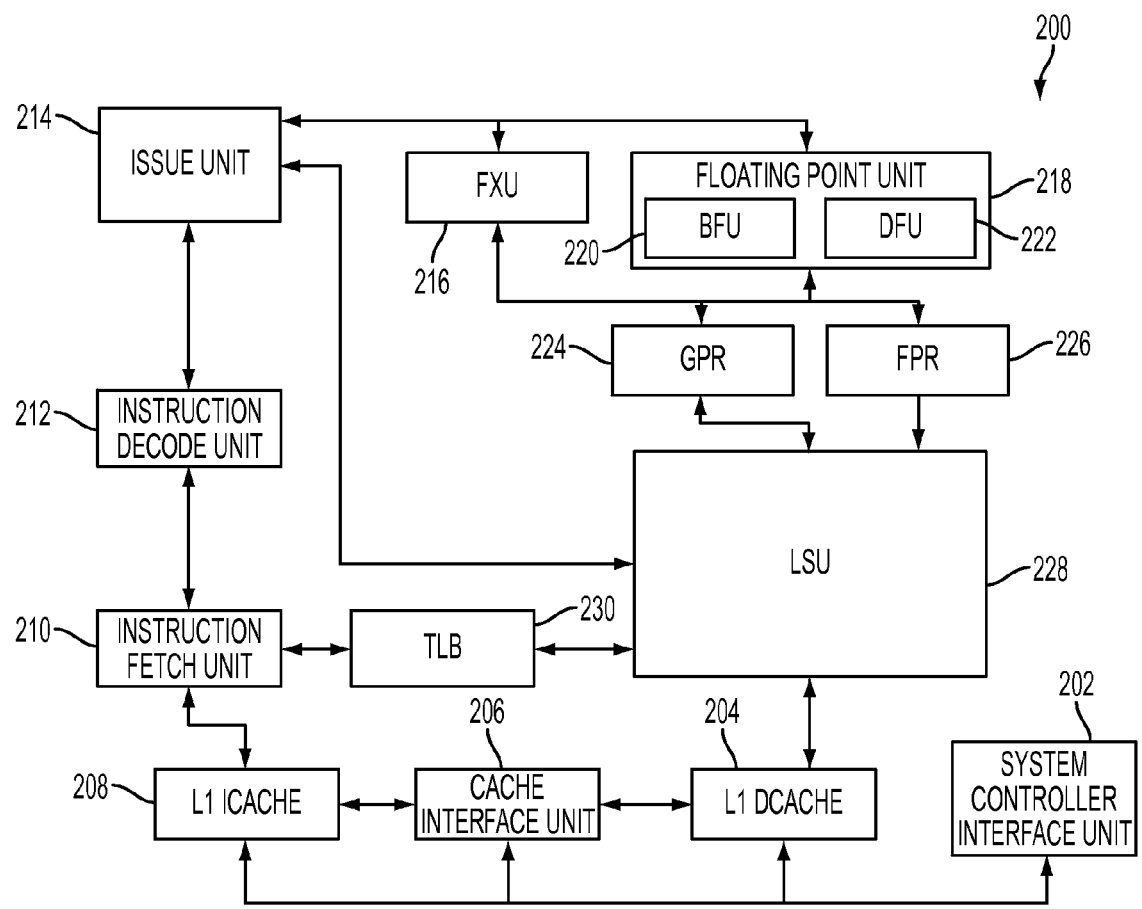
FIG. 2 depicts a physical processor that may be implemented in accordance with an embodiment.

Turning now to FIG. 2, a block diagram of a processing circuit 200 for implementing a machine or physical core, such as physical core 106 in FIG. 1, is generally shown in accordance with an embodiment. The processing circuit 200 can include one physical core of a plurality of physical cores in a multi-processing environment. The processing circuit 200 shown in FIG. 2 includes a system controller interface unit 202 that can couple the processing circuit 200 to other cores and peripheral devices. The system controller interface unit 202 can also connect Dcache 204, which reads and stores data values, Icache 208, which reads program instructions, and a cache interface unit 206 to external memory, processors, and other peripheral devices.

The Icache 208 can provide loading of instruction streams in conjunction with an instruction fetch unit (IFU) 210, which pre-fetches instructions and may include speculative loading and branch prediction capabilities. The fetched instructions can be provided to an instruction decode unit (IDU) 212 for decoding into instruction processing data.

The IDU 212 can provide the instructions to an issue unit 214 which can control the issuing of the instructions to various execution units, such as one or more fixed point units (FXU) 216 for executing general operations and one or more floating point units (FPU) 218 for executing floating point operations. The FPUs 218 can include a binary floating point unit (BFU) 220, a decimal floating point unit (DFU) 222, or any other floating point unit. The issue unit 214 can also be coupled to one or more load/store units (LSU) 228 via one or more LSU pipelines. The multiple LSU pipelines are treated as execution units for performing loads and stores and address generation for branches. Both the LSU 228 and the IFU 210 can utilize a translation-lookaside-buffer (TLB) 230 to provide buffered translations for the operand and instruction addresses.

The FXU 216 and FPU 218 are coupled to various resources such as general-purpose registers (GPR) 224 and floating point registers (FPR) 226. The GPR 224 and FPR 226 provide data value storage for data values loaded and stored from the Dcache 204 by a LSU 228.

Figure 3:
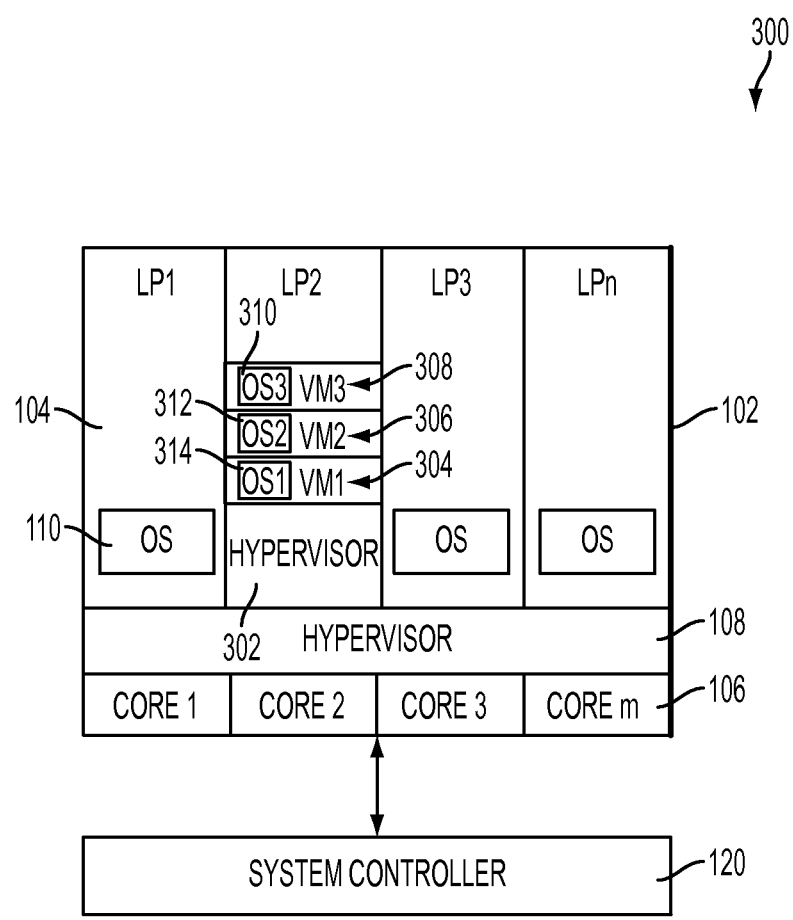
FIG. 3 depicts a computing environment that may be implemented in accordance with an embodiment.

Turning now to FIG. 3, a computing environment 300 that may be implemented by an embodiment is generally shown. The computing environment 300 shown in FIG. 3 is similar to the computing environment 100 shown in FIG. 1 with the addition of a level-1 hypervisor 302 executing in the logical partition 104 labeled LP2. As shown in FIG. 3, the level-1 hypervisor 302 can provide the same hypervisor functions described previously with respect to hypervisor 108 (also referred to herein as a "level-0 hypervisor"), such as transparent time-slicing of resources between multiple operating systems (e.g. OS1 314, OS2 312, and OS3 310 running in virtual machines VM1 304, VM2 306, and VM3 308) and isolation of those operating systems from one another, within the logical partition 104 labeled LP2. The embodiment shown in FIG. 3 includes three virtual machines as an example and other embodiments may include more or fewer virtual machines based on application requirements.

As shown in FIG. 3, the logical partition 104 labeled LP1 has a resident operating system 110, and the logical partition 104 labeled LP2 runs a level-1 hypervisor 302 which in turns creates virtual machines 304 306 308 each of which runs its own resident operating systems 314 312 310. Any number of the logical partitions 104 may run a level-1 hypervisor 302. In an embodiment, the level-1 hypervisor 302 is the z/VM hypervisor, offered by International Business Machines Corporation, Armonk, N.Y. The resident operating systems running in the various logical partitions may differ and, when running under a level-1 hypervisor 302, the resident operating systems (e.g., operating systems 314 312 310) within a single partition 104 (e.g., LP2) may also differ. In an embodiment, operating system 110 in the logical partition 104 labeled LP1 is the z/OS operating system, which is offered by International Business Machines Corporation, Armonk, N.Y. In an embodiment, operating systems 310 and 312 are Linux and operating system 314 is z/OS.

When a level-1 hypervisor 302 is running in a logical partition 104 it can provide the same virtualization of resources provided by a level-0 hypervisor, such as hypervisor 108, to logical partitions 104 to the operating systems 310 312 314 running in virtual machines 308 306 304. As at the first level, each virtual machine may include multiple virtual processors.

Physical cores 106 include physical processor resources that can be dedicated or shared, as described for FIG. 1, between the logical partitions 104 LP1, LP2, LP3 and LP4. When logical partition LP2 is dispatched on one or more physical cores, the level-1 hypervisor 302 can then transparently share those resources between its virtual machines VM1 304, VM2 306 and VM3 308. In one embodiment, level-0 hypervisor 108 uses a start-VE instruction with MT specified to dispatch a multithreaded level-1 hypervisor 302 which then uses a start-VE instruction with ST specified to dispatch single-threaded virtual machines VM1 304, VM2 306 and VM3 308. In a different embodiment, level-0 hypervisor 108 uses a start-VE instruction with ST specified to dispatch a single threaded level-1 hypervisor 302 which then uses a start-VE instruction with MT specified to dispatch multithreaded virtual machines VM1 304, VM2 306 and VM3 308. In another embodiment both level-1 hypervisor 302 and its guest VMs 304 306 308 are all single-threaded.

In a guest multiprocessing (MP) environment, the hypervisor can maintain a control structure, known as the system control area (SCA), which is used by both the hypervisor and the machine to manage certain functions which may affect multiple logical processors in the guest configuration. The same SCA origin (SCAO) is specified in the state description for all the guest processors in the configuration or virtual machine. In an embodiment, this area can include a common area (used, in general, to coordinate guest-configuration-wide functions) and separate, processor-specific entries. The common area, for example, holds information about which virtual processors within the guest configuration are valid. The separate, processor-specific area within the SCA can, for example, be used to interpret or emulate inter-processor guest functions such as an inter-processor interruption or to provide easily accessible pointers to each logical processor's respective state description. In an embodiment the SCA used for ST is extended for MT use by adding additional thread-specific entries for each potential guest thread.

An embodiment of a core dispatch can allow a hypervisor that is running on a single thread to dispatch a multithreaded guest on its core using a variation of the start-VE instruction, sometimes referred to as start multithreaded virtual-execution (start-MVE). Each thread in the multithreaded guest can represent a guest logical central processing unit (CPU), or guest thread. The start-VE instruction can enable multithreading (MT) guest execution on the physical core, via a control field in the state description. The operand of the start-VE instruction when used for core dispatch can specify either a single state description which contains the state of all the guest threads or a group of state descriptions each of which, for example, represents the state of a single guest thread. In an embodiment, the logical core includes this group of state descriptions. Core dispatch requires virtual-execution entry to load the state of the logical core and each of these guest logical threads into a physical core thread and its threads. These threads can be instruction streams which operate independently from one another. In various embodiments, a group of state descriptions can be specified a number of ways including as fixed offsets from one another, as a list of state description addresses or state descriptions, or as a circular list (ring) of state descriptions that applies to the core with each state description in that group representing a separate guest thread. Such techniques allow for easy access by the hypervisor and the machine to other threads within the logical core and allow for fields which apply to the entire logical core to be maintained in a single place.

The guest OS can make use of multithreading simply by issuing an MT-setting instruction which enables multithreading in the guest. This allows the guest OS to treat these new threads as additional, independent CPUs and manage them as it would in the absence of multithreading. In addition, the guest OS may use these threads in a way that leverages the fact that they share a core or it can have them operate in a more interdependent manner. This is all transparent to the hypervisor and the machine. The hypervisor then provides these additional threads to the guest OS while the hypervisor itself continues to run on a single thread per core and to manage much of the guest MT environment on a core basis. The OS enablement of multithreading is described in more detail in U.S. patent application Ser. No. 14/226,895, entitled "Thread Context Preservation in a Multithreading Computer System," which is filed concurrently herewith, the contents of which are incorporated by reference herein in its entirety.

In an embodiment of core dispatch, the state description which is specified as the operand of the start-VE instruction with MT specified is a "primary" state description and the associated guest logical thread is the "primary" thread. The other state descriptions in the group are referred to herein as "secondary" state descriptions and, if applicable, apply to secondary logical threads. When the state description group is implemented as either a list or a ring, there can be a next-state-description (NSD) field in the primary state description that points to the first secondary state description which in turn, either 1) points to the next secondary state description in the group or 2) contains a value to indicate the end of a group. The NSD value in the state description for the last in the list may be the address of the primary state description in which case the list forms a ring of state descriptions.

In a non-MT implementation, the hypervisor dispatches one guest logical processor (also referred to herein as a "logical thread") on a given physical core at a time. If a particular logical processor is in an invalid state, for example, in the stopped state or in a disabled wait, the hypervisor will not dispatch that guest. In an MT environment, the core dispatch allows the hypervisor to dispatch multiple guest threads on the core at the same time. In order to accommodate the possibility that one or more of the threads in that logical core's state-description group is invalid, an embodiment utilizes a thread-validity mask (TVM) in the primary state description, each bit of which indicates the validity, from a software perspective, of the logical thread in the corresponding state description in the group.

In another embodiment, only valid threads are included in the state description group and no validity indication is necessary. An embodiment which includes invalid logical threads in the state description group allows the hypervisor to maintain the state associated with these invalid threads and these threads may become valid again in the future. The machine will only initialize and run those threads which have a valid state. The hypervisor will only dispatch a guest logical core if at least one thread in the group is valid.

Figure 4:
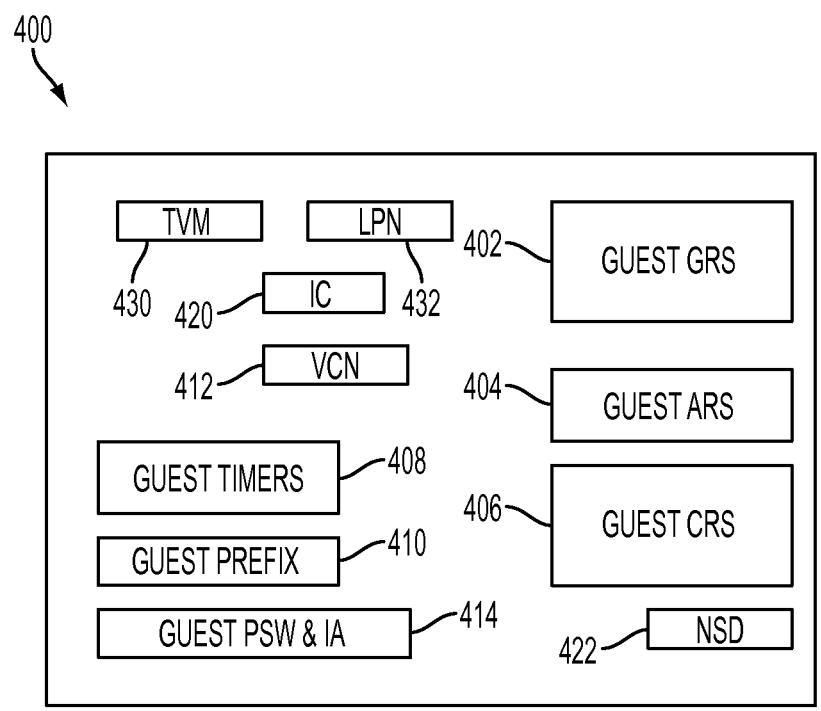
FIG. 4 depicts a state description of a multithreaded (MT) logical thread in accordance with an embodiment.

Turning now to FIG. 4, a state description of a logical thread that includes most of the architected state of the guest is generally shown in accordance with an embodiment. In this context, the term "state description" includes not only the state description itself but also the satellite blocks, whose pointers reside in the state description, that act as an extension. As shown in FIG. 4, the state description 400 can include the guest general registers (GRs) 402, access registers (ARs) 404, control registers (CRs) 406, guest timers 408 (including clock comparator and CPU timer), guest prefix register 410, virtual CPU number (VCN) 412, program-status word (PSW) and instruction address (IA) 414. In addition, it can include control information such as interception control (IC) bits 420 to indicate if certain instructions (e.g., Load Program Status Word (LPSW) and Invalidate Page Table Entry (IPTE)) require interception to the host or if purging of the guest translation lookaside buffer (TLB) is required before guest instruction execution can begin. The state description also contains the next-state-description (NSD) 422 which is used to define state description lists and rings as described in FIGS. 6-9. The primary state description also includes the TVM 430 as described in FIG. 5 and the logical-partition number (LPN) 432. The virtual CPU number (VCN) 412 is equivalent to the CPU number, potentially adjusted to include the thread number in MT mode, as described in U.S. patent application Ser. No. 14/226,947, entitled "Address Expansion and Contraction in a Multithreading Computer System," which is filed concurrently herewith, the contents of which are incorporated by reference herein in its entirety.

Threads within a core may be identified by a binary thread identification (TID). For brevity in the below figures, thread x is often referred to by the term TIDx, in which case the meaning is "the thread having TID x".

Figure 5:
FIG. 5 depicts a block diagram of a thread-validity mask (TVM) in accordance with an embodiment.

Referring now to FIG. 5, a block diagram of a thread-validity mask (TVM) 520 is generally shown in accordance with an embodiment. As shown in FIG. 5, bit 0 530 of the TVM 520 represents the validity of logical thread 0 in the state description group, bit 1 531 represents the validity of thread 1, bit 2 532 represents the validity of thread 2, bit 3 533 represents the validity of thread 3 and so forth until bit n 537 which represents the validity of thread n, the last possible logical thread in the state description group associated with this core. The TVM can reside in the primary state description for the group.

Figure 6:
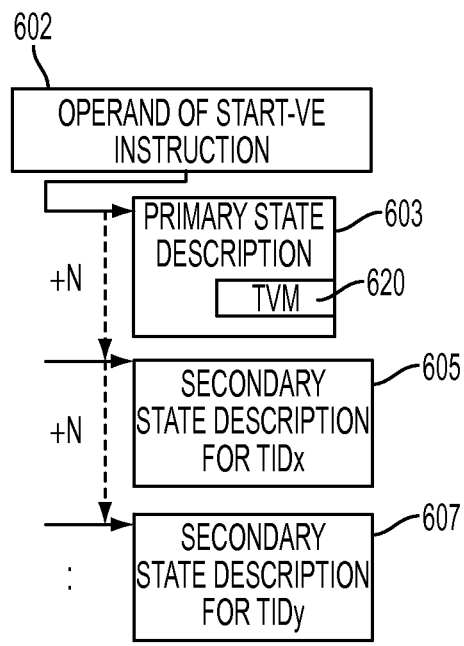
FIG. 6 depicts a fixed offset state description group in accordance with an embodiment.

Turning now to FIG. 6, a fixed offset state description group structure is generally shown in accordance with an embodiment. As shown in FIG. 6, the state description group is specified at fixed offsets (N) from one another. In this case, the operand of the start-VE instruction 602 points to the primary state description 603 for logical thread 0. The secondary state description for logical thread x 605 is located at a fixed offset of N bytes after the primary state description and the secondary state description for logical thread y 607 is located N bytes after the secondary state description for thread x. This continues for all the threads in the group. The number of threads in the group can be determined a number of ways including by a count in the primary state description or by an end marker following the last state description address in the list.

FIG. 6 can represent two cases, the first case being where the group includes state descriptions for all logical threads in the group, whether they are valid or not, and the second case being where only valid state descriptions are included in the group. In the first case, the state description for thread x 605 represents the state of thread 1 and that for thread y 607 represents the state of thread 2. The TVM 620, which is only needed in this first case, represents the validity of each of these logical threads. In the second case, the state description for thread x 605 represents the state of the first valid logical secondary thread and the state description for logical thread y 607 represents the state of the second valid secondary thread. For example, if thread 1 is not valid and threads 2 and 3 are both valid, then thread x 605 would represent thread 2 and thread y 607 would represent thread 3. There would be no state description included in the group for thread 1 since it is invalid. These same two cases can also apply to the embodiments shown in FIGS. 7-9 below, however only case 1 is described and pictured.

Figure 7:
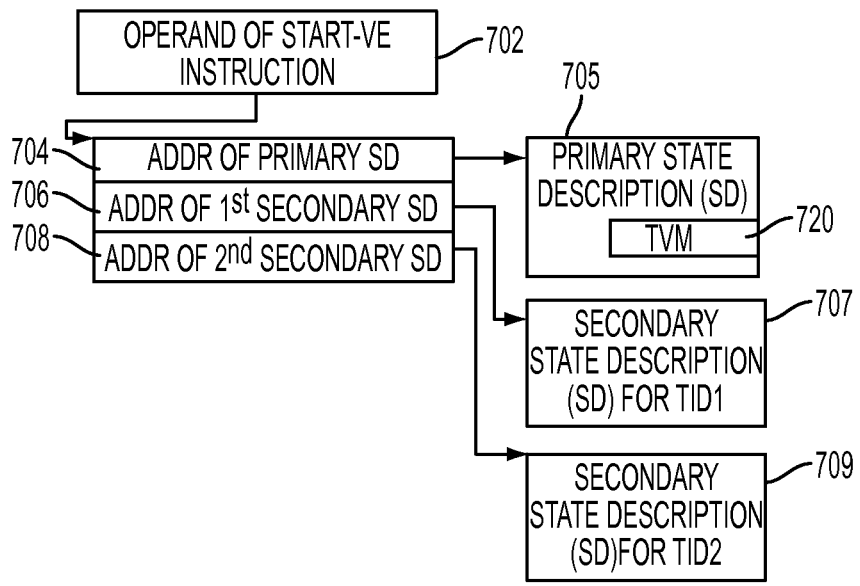
FIG. 7 depicts a state description group specified as an address list in accordance with an embodiment.

Turning now to FIG. 7, a state description group structure specified as a list is generally shown in accordance with an embodiment. In this case, the operand of the start-VE instruction 702 represents a list of state description addresses with the first entry in the list 704 pointing to the primary state description 705 for thread 0, the second entry in the list 706 pointing to the secondary state description for thread 1 707, the third entry in the list 708 pointing to the secondary state description for thread 2 709, and so on, continuing for all threads in the group. The TVM 720 represents the validity of each of these threads.

Figure 8:
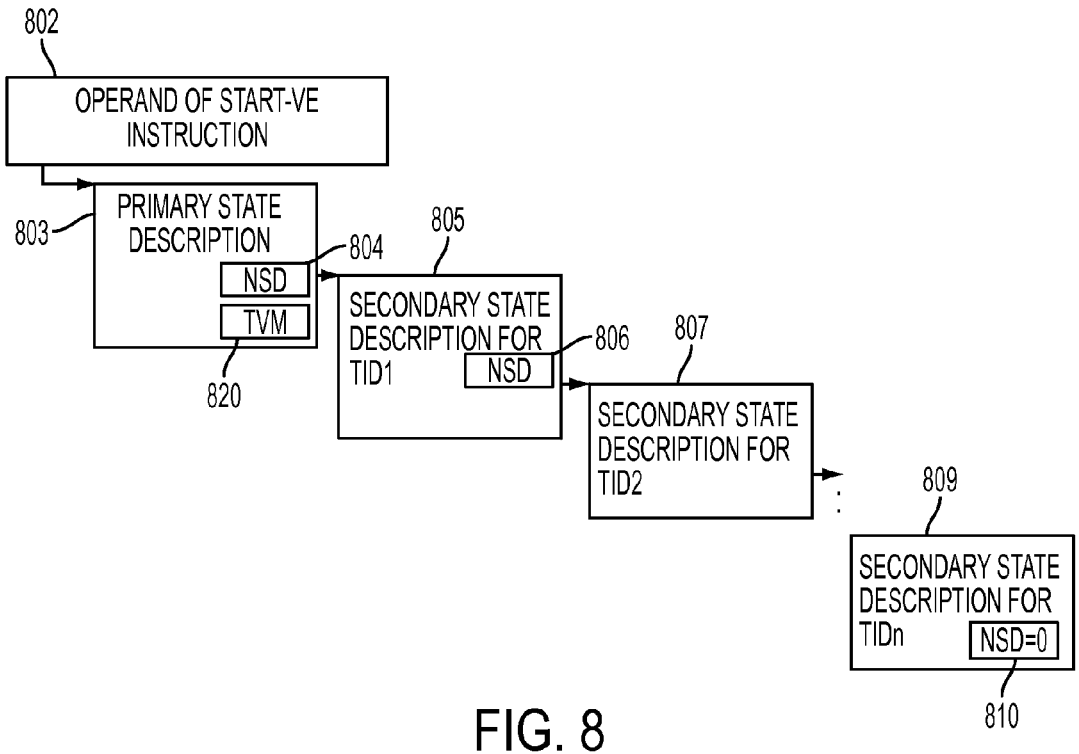
FIG. 8 depicts a state description group specified as a linked list in accordance with an embodiment.

Turning now to FIG. 8, a state description group structure specified as a linked list is generally shown in accordance with an embodiment. In this case, as in the case depicted in FIG. 6, the operand of the start-VE instruction 802 points to the primary state description for thread 0 803 but, instead, the pointer 804 for the secondary state description for thread 1 805 is provided as a next state description (NSD) field 804 in the primary state description. In turn, the pointer 806 for the secondary state description for thread 2 807 is provided as an NSD 806 in the secondary state description for thread 1. This would continue for all threads in the group with the NSD 810 in the state description for the last thread n 809 being specified as zeroes or some other unique value indicating the end of the list. The TVM 820 provided in the primary state description 803 represents the validity of each of these threads.

Figure 9:
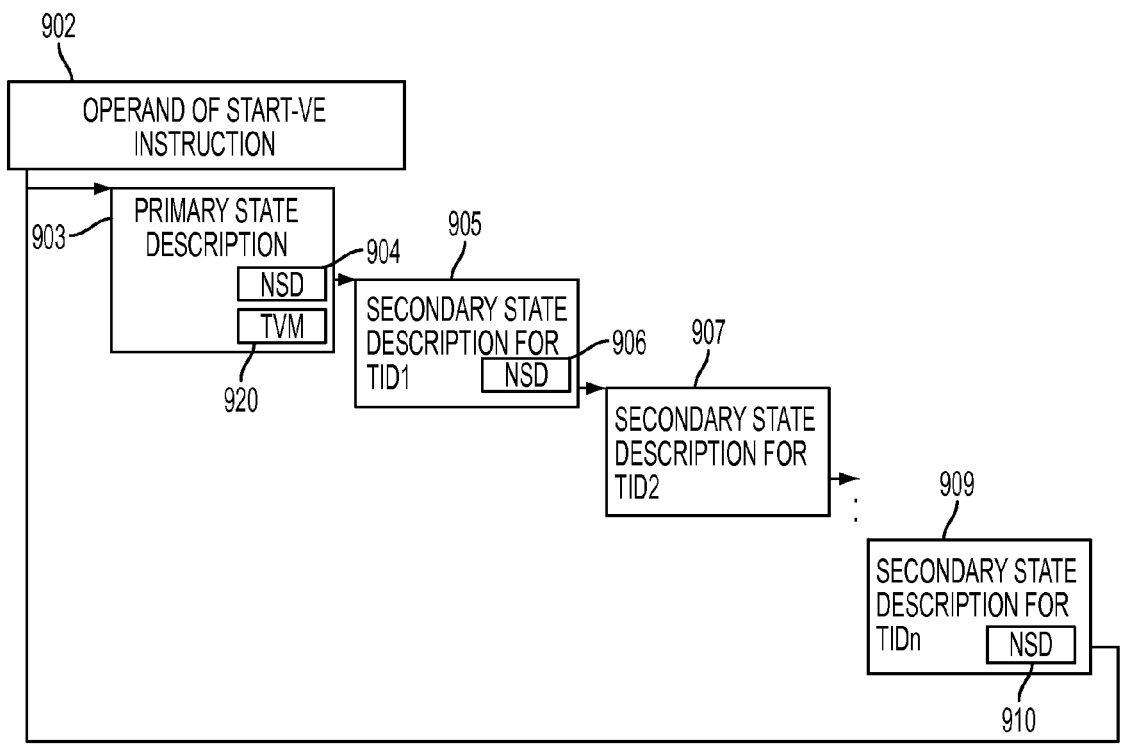
FIG. 9 depicts a state description group specified as a circular list or ring in accordance with an embodiment.

Turning now to FIG. 9, a state description group structure specified as a circular list or ring is generally shown in accordance with an embodiment. This case is identical to the case shown in FIG. 8 in that the operand of the start-VE instruction 902 points to the primary state description 903 for thread 0, which contains an NSD 904 for the secondary state description for thread 1 905, which contains an NSD 906 for the secondary state description for thread 2 907 and this continues for all threads up to the last thread n. In the embodiment shown in FIG. 9, however, the NSD 910 in the state description for thread n 909 forms a circular list and points back to the primary state description 903. The TVM 920 provided in the primary state description 903 represents the validity of each of these threads.

The core dispatch allows the hypervisor to manage many aspects of the logical threads at the core level. Core dispatch not only often simplifies the hypervisor code required for thread management by pushing the coordination of virtual-execution of multiple threads of a core into the machine, but it can also reduce the overhead required for managing more processors in the configuration. Priority management for logical partitions (or guests) can continue to be done at the logical core level, reducing scaling pressure on this type of management. The hypervisor itself still needs to manage the collection of threads associated with a logical core to make sure its needs (such as instruction interceptions) are all met before reissuing the start-VE instruction.

Figure 10:
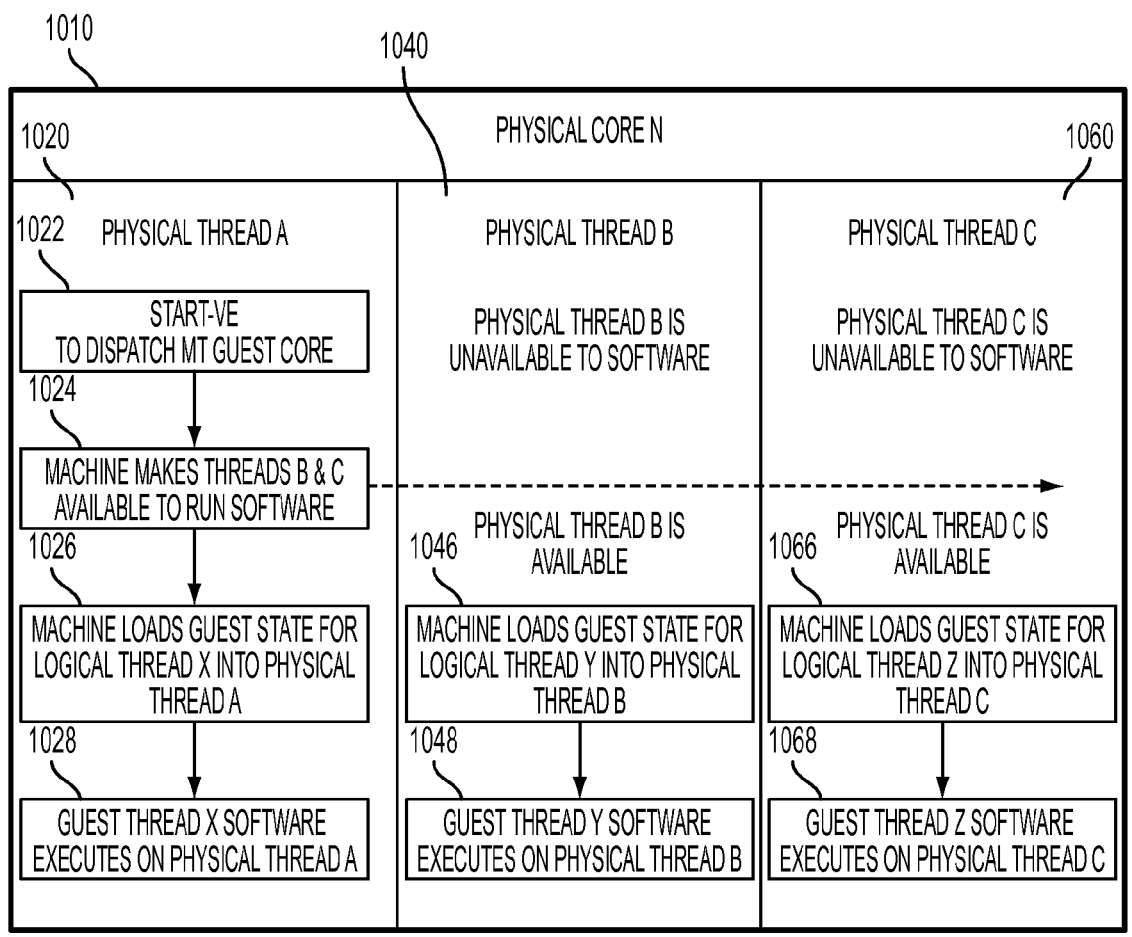
FIG. 10 depicts a core dispatch process in accordance with an embodiment.

Referring now to FIG. 10, a core dispatch process in accordance with an embodiment is generally shown. As shown in FIG. 10, a hypervisor is running single-threaded on physical core N 1010 and physical thread A 1020. In block 1022, the hypervisor issues the start-VE instruction with MT specified to dispatch the multithreaded guest core. The machine determines that the guest is multithreaded and, in block 1024, makes physical threads B and C available to run software. The machine loads the guest state from the state description for each of the threads into a corresponding physical thread. In the embodiment depicted in FIG. 10, the machine uses multiple physical threads to perform this function, that is, millicode running on physical thread A 1020 loads the state of guest logical thread X into physical thread A, as shown in block 1026. Likewise, millicode running on physical threads B 1040 and C 1060 load the state of guest logical threads Y and Z into physical threads B and C as shown in blocks 1046 and 1066. Once the guest state is loaded, the software running on guest logical threads X, Y, and Z executes on physical threads A, B, and C as shown in blocks 1028, 1048 and 1068.

Figure 11:
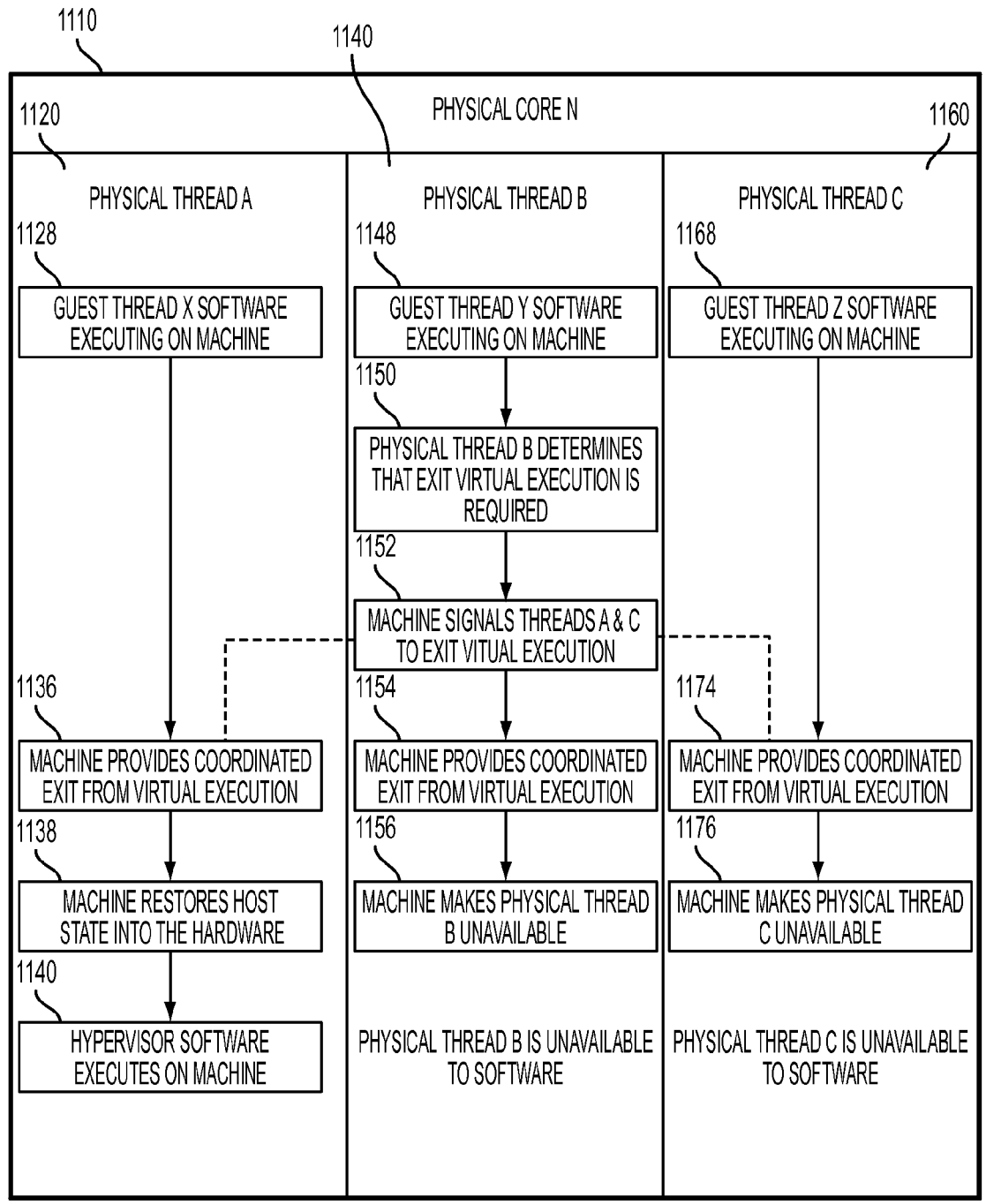
FIG. 11 depicts a coordinated exit from virtual-execution in accordance with an embodiment.

Referring now to FIG. 11, a coordinated exit from virtual-execution is generally shown in accordance with an embodiment. As shown in FIG. 11, guest logical threads X, Y and Z are executing guest software on physical threads A 1120, B 1140, and C 1160 as indicated in blocks 1128, 1148 and 1168. Also, physical threads A 1120, B 1140, and C 1160 are executing on physical core N 1100. One or multiple guest threads determine that an exit from virtual-execution is required. Referring to FIG. 11, guest logical thread Y running on physical thread B 1140 determines that it must exit virtual-execution, as shown in block 1150, causing the machine to signal physical threads A 1120 and C 1160 to exit virtual-execution, as shown in block 1152. In blocks 1136, 1154 and 1174, millicode running on each of the physical threads coordinates the exit from virtual-execution and then makes physical threads B 1140 and C 1160 unavailable for use by software as indicated in blocks 1156 and 1176. Millicode on physical thread A 1120 reloads the host state into the hardware as shown in block 1138 which results in the execution of the hypervisor software on physical thread A as shown in block 1140. The hypervisor will then process any pending guest interceptions and host interruptions as needed.

FIG. 12 depicts a block diagram of a core-oriented system control area (COSCA) for a single guest configuration that includes multiple logical cores in accordance with an embodiment. The COSCA shown in FIG. 12 can be used to provide coordination both between logical threads within a core and between logical threads on different cores. The COSCA can include a common area representing the entire guest configuration with pointers, one for each logical core, to separate core-description areas. Each core-description includes a common area representing that core and a series of contiguous, separate, thread-specific areas or thread descriptions for that core. In another embodiment the core description provides the locations of the thread descriptions. The provided locations may be implied (e.g., they are a list contained in the core description, or they may be in memory blocks that are consecutive to the core description). In other embodiments, pointers to other memory locations containing the thread descriptions may be provided. As used herein, the term "indicates a location" is used to refer to any of these, or any additional manner, of determining a location of an item (e.g., the thread descriptions or other elements in the COSCA). This structure maintains the tree-like representation of the MT guest configuration which facilitates in some situations, particularly at the hypervisor level, things to be managed on a core basis but in other situations things to be managed on a thread or processor basis.

The same COSCA origin (COSCAO) can be provided in the SCA origin (SCAO) field in the state descriptions for all the guest threads within the guest configuration and the same core-description area address (CDAA) can be provided for all threads within a given core. An advantage of this embodiment is that it does not require as much contiguous real storage which can be difficult for some hypervisors to provide. Another embodiment could add an additional level of indirection and have each core description include a list of pointers for each thread-specific area removing the need for the control blocks containing these areas to be contiguous.

Referring now to FIG. 12, an example embodiment of a COSCA for a single guest configuration which includes two logical cores with three logical threads in each core is generally shown. In an embodiment the COSCA includes the contents of the COSCA common area 1260 (shown in FIG. 12 as "COSCACA 1260"), core description area 1270, and core description area 1280. The primary state description for the state description group associated with logical core 0 1203 is specified as the operand of the start-VE instruction used by the hypervisor to dispatch guest core 0 1202. In addition, the primary state description for the state description group associated with logical core 1 1233 is specified as the operand of the start-VE instruction used to dispatch core 1 1232. This primary state description for "core 0 thread 0" 1203 contains NSD01 1205, which points to the secondary state description for core 0 thread 1 1213 which, in turn, contains NSD02 1215, which points to the final secondary state description for core 0 thread 2 1223 in the group. Similarly, the state description group for logical core 1 begins with the primary state description for core 1 thread 0 1233 containing NSD11 1235, which points to the secondary state description for core 1 thread 1 1243 containing NSD12 1245, which points to the final secondary state description for core 1 thread 2 1253. The state descriptions for all six threads in this guest configuration 1203 1213 1223 1233 1243 1253 contain the same value in SCAO 1204 1214 1224 1234 1244 1254, pointing to COSCA common area 1260.

The COSCA common area 1260, as shown in FIG. 12, contains core-level information used to coordinate guest configuration-wide functions. The COSCA common area 1260 includes an SCA core validity mask (SCVM) 1261 which indicates the validity of each logical core within the guest configuration and also includes a core-description area address (CDAA) for each core 1262 1264. Both the bits in the SCVM and the array of core-description addresses may be indexed by the core number. CDAA0 1262, which points to the core description area (CDA) for core 0 1270, is included in the COSCA common area 1260. Additionally, the CDAA field in the state descriptions for all threads in core 0 1206 1216 1226 also point to the CDA for core 0 1270. CDAA1 1264, which points to the CDA for core 1 1280, is also included in the COSCA common area 1260, and likewise the CDAA field in the state descriptions for all the threads in core 1 1236 1246 1256 also point to the CDA for core 1 1280. The core description area (CDA) for core 0 1270 contains an SCA thread validity mask (STVM0) 1271 which indicates the validity of each logical thread within core 0. It also contains the thread description areas for core 0 thread 0 1272, thread 1 1274, and thread 2 1276. The CDA for core 1 1280, similarly contains STVM1 1281 and the thread description areas for core 1 thread 0 1282, thread 1 1284, and thread 2 1286). Each of these thread description areas 1272 1274 1276 1282 1284 1286 contain a state description address (SDA) 1273 1275 1277 1283 1285 1287 for the thread corresponding to that thread description area, core 0 thread 0, core 0 thread 1, core 0 thread 2, core 1 thread 0, core 1 thread 1, and core 1 thread 2, respectively. Both the bits in the STVM and the array of thread description areas may be indexed by the thread identification. These SDAs make it easier for the hypervisor to manage threads within a core and for the machine to present guest inter-processor interruptions.

Figure 13:
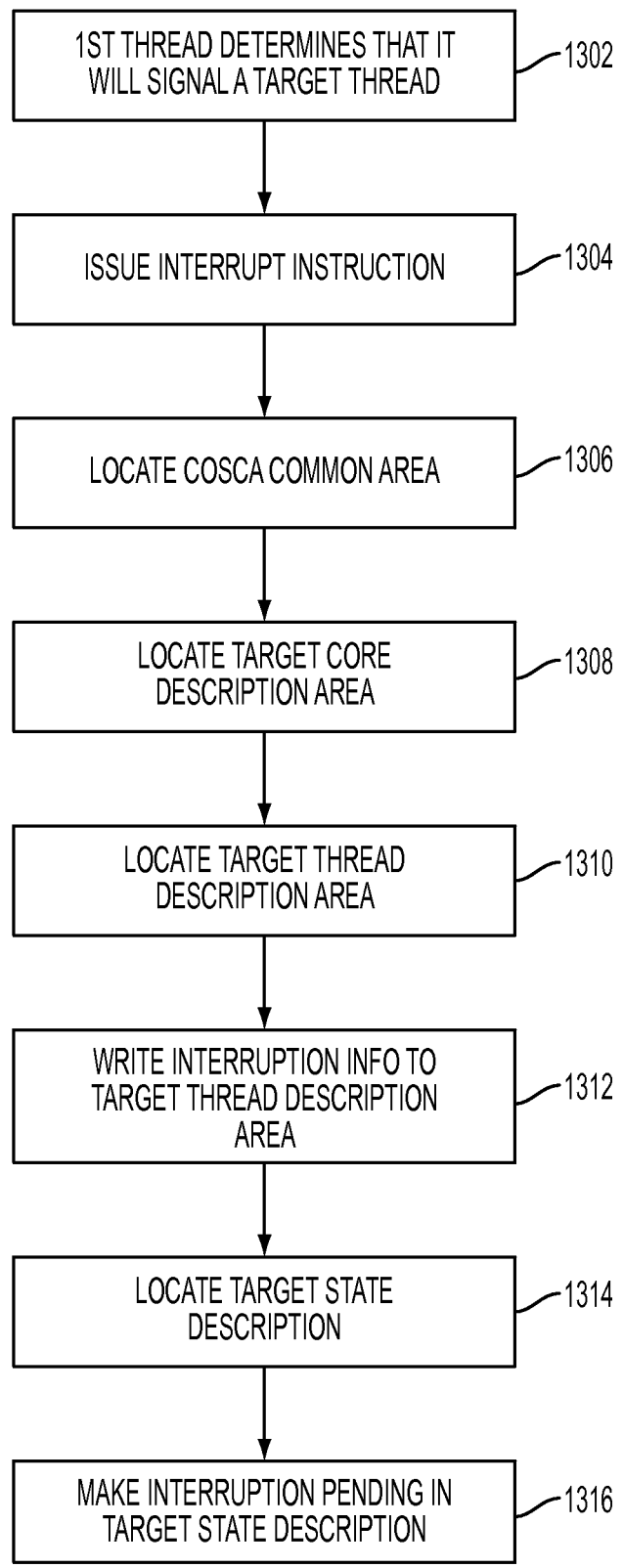
FIG. 13 depicts a process flow for coordinating between multithreaded cores in accordance with an embodiment.

FIG. 13 depicts a process flow for managing multi-threaded cores in accordance with an embodiment that uses the COSCA shown in FIG. 12. In the example shown in FIG. 13, at block 1302, a guest operating system (OS) running on a first physical thread (e.g., core 0 thread 1 defined by state description 1213) has determined that it will signal a second logical thread, or target thread, (e.g., core 1 thread 2 defined by state description 1253). At block 1304, the guest OS does this, for example, by issuing an inter-processor-interrupt instruction. The machine, as part of executing the inter-processor-interrupt instruction, uses the COSCA to emulate the guest inter-processor-interrupt instruction. The inter-processor-interrupt instruction is emulated by the machine since the logical core that includes the target logical thread may or may not be dispatched at the time the signaling is being done. At block 1306, the machine locates (e.g., via SCA0 1214 since the inter-processor-interrupt instruction was executed by logical core 0 thread 1) a common area (e.g., COSCA common area 1260) for the guest configuration in order to access an SCVM (e.g., SCVM 1261) to verify the validity of the target core and to obtain the appropriate CDAA (e.g. CDAA1 1264 since the target thread is on core 1).

Next, at block 1308, the machine locates (e.g., via CDA1 1264) the core description area for the target core (e.g., CDA 1280). The machine verifies that the target thread is valid by accessing an STVM in the core description area (e.g., STVM1 1281 in CDA 1280). At block 1310, the machine locates the thread description area (e.g. thread description area 1286 corresponding to thread 2 since the target thread is thread 2). At block 1312, information about the interruption is recorded in the thread description area for the target thread (e.g., it places the identity of the sending thread into thread description area 1286). At block 1314, the machine locates (e.g. via SDA12 1287 in thread description area 1286) the state description for the target thread (e.g. secondary state description for core 1 TID2 1253). At block 1316, the interruption is made pending in the target state description (e.g., the IP bit 1257 is set in state description for core 1 TID2 1253). As a result, when the target logical processor (e.g. core 1 thread 2) is dispatched on a physical thread and is enabled for the interruption, the machine will present the interruption, if enabled, to the guest operating system. If the target logical processor is already dispatched at the time that the interruption becomes pending, it will take the interruption once it is enabled.

There are instances where the machine can also make use of the fact that threads within a logical core have attributes in common. For example, core dispatch naturally lends itself to having all guest threads on a logical core reside in the same LPAR zone or partition. The design can minimize hardware by only having to implement things associated with the zone once per core instead of once per thread. In addition, complicated control logic (handling of system-wide interruptions, for example) can also be simplified since it must only deal with a single core value.

In one embodiment, each field (or bit within a field) in the group of state descriptions representing a multithreaded guest is classified as primary, core-common, or thread-specific. A primary field resides only in the primary state description and applies to all processors in the logical core; any access made to a primary field on behalf of any thread of a core must use the value from the associated primary state description. This classification is used for fields which define the overall state of the core, such as the thread-validity mask. A core-common field is common among all processors within a logical core and this field has the same value in every state description in the group; any access made to one of these fields on behalf of a processor may use the value from any state description in the group. This classification is used for fields that apply across the entire core, such as the LP number. The hypervisor is required to maintain the core-common fields in all the state descriptions but the machine is allowed to access this field in the state description of any thread, whichever provides the best performance. Since these fields are not often changed by the hypervisor but are often accessed by the machine on every entry into virtual-execution, defining a field as core-common rather than thread-specific allows virtual-execution entry, for example, to load a secondary thread facility from the primary thread using the value in the primary state description. A thread-specific field is specific to each logical thread; any access made to one of these fields on behalf of any given thread must use the value from that thread's state description. This classification is used for fields that are typically unique between threads, such as the guest prefix.

In an embodiment, in order to support the use of core dispatch and the hypervisor running single threaded, a coordinated exit from virtual-execution (VE-exit) in which all the guest threads in a given core exit back to the ST host at the same time can be provided. In the context of coordinated VE-exit, types of VE-exit can be divided into three categories: (1) host interruptions which pertain to host operation; (2) host interruptions which pertain to guest operation; and (3) guest interceptions. Host external, I/O, and some machine check interruptions fall into VE-exit category (1). For this case, all guest threads are required to exit virtual-execution mode in order to allow the host to handle the interruption. This interruption will likely cause the host to dispatch a different guest. If the interruption occurs while running in virtual-execution mode, the host interruption can either be detected on all threads so that they can exit virtual-execution mode or be detected on a single thread which then signals the other threads if they should exit.

VE-exit category (2), host interruptions which pertain to the guest, can include some machine check interruptions (such as an uncorrectable storage error). In a non-multithreaded situation, these conditions are presented as host interruptions. With core dispatch there is only one host thread but since these exceptions pertain to guest operation it is possible for multiple guest threads to detect distinct and different reasons for the same host interruption. To accommodate this, for core dispatch, when applicable, these host interruptions are instead presented in the corresponding guest state description as a new type of guest interception and are handled the same as category (3), described below. In an embodiment, host address-translation fault interruptions arising due to guest memory references also fall into category (2), and may be presented as another new type of guest interception.

Guest interceptions, even in a guest multithreaded environment, for both VE-exit categories (2) and (3) (above) pertain to a single guest thread and are independent from guest execution of another thread. It is further possible that multiple guest threads recognize such conditions concurrently, requiring the host to handle all of them. Typically, when presented with an interception, the host will simulate some behavior on the guest's behalf and then re-dispatch that same guest. For these cases, since the host is running single-threaded, all guest threads must exit virtual-execution mode before the host can handle the interception(s). This can be accomplished by either waiting for all threads to exit naturally or by signaling the other threads to exit when one thread has determined that it must intercept back to the host. This is referred to as "coordinated VE-exit".

As each thread determines it must exit virtual-execution mode, it enters VE-exit, and waits in the initial VE-exit sync-up loop until all the other valid threads are also ready to exit. If the implementation requires, then it signals the other threads to exit before entering this sync-up loop. While in the VE-exit sync-up loop, only a minimum of interruptions are handled. In order to allow for the situation where a guest thread is required to exit virtual-execution mode when no host interruption and no guest interception apply, a "no-action" interception is defined to indicate to the host that no interception action is required on behalf of this guest.

Once all the threads have entered the initial VE-exit sync-up loop, the storing of guest data in all of the valid state descriptions can complete. That is, the current guest state which resides in the hardware is saved in the corresponding state description so this logical guest thread can be re-dispatched at a later time. A final VE-exit sync-up point is required after this storing is complete to guarantee all updates to the secondary thread state descriptions are complete before control is passed back to the hypervisor (which is typically running on the primary thread). Once VE-exit completes, the hypervisor can process each thread in the ring to determine if an interception was presented and, if so, handle it appropriately. After doing so it can then either re-dispatch this same guest logical core or a different one on the physical processor.

Technical effects and benefits include providing thread management support for a host (e.g., a hypervisor) in a VM configuration. The COSCA can be used to assist in the management by allowing the host to easily access the state descriptions for all of the threads in the VM configuration.

Embodiments include a system, method, and computer program product for providing a control area for managing multiple threads in a computer. According to one aspect, a computer system includes a virtual machine (VM) configuration having one or more cores, where each core is enabled to operate in a single thread (ST) mode or a multithreading (MT) mode. The ST mode consists of a single thread and the MT mode consists of a plurality of threads on shared resources of a respective core. The computer system also includes a core-oriented system control area (COSCA) having a common area representing all of the one or more cores of the VM configuration and separate core description areas for each core of the one or more cores in the VM configuration. Each core description area indicates a location of one or more thread description areas each representing a thread within the respective core, and each thread description area indicates a location of a state description of the respective thread. The computer system further includes a facility configured to control the configuration to perform a method. The method includes managing threads of the one or more cores of the VM configuration based on contents of the COSCA.

According to another aspect, a computer-implemented method for managing multiple threads in a virtual machine (VM) configuration is provided. The configuration includes one or more cores, where each core is enabled to operate in a single thread (ST) mode or a multithreading (MT) mode. The ST mode consists of a single thread and the MT mode consists of a plurality of threads on shared resources of a respective core. The method includes providing a core-oriented system control area (COSCA) having a common area representing all of the one or more cores of the VM configuration and separate core description areas for each core of the one or more cores in the VM configuration. Each core description area indicates a location of one or more thread description areas each representing a thread within the respective core, and each thread description area indicates a location of a state description of the respective thread. The method further includes managing, by a core, threads of the one or more cores of the VM configuration based on contents of the COSCA.

A further aspect includes a computer program product for managing multiple threads in a virtual machine (VM) configuration. The configuration includes one or more cores, where each core is enabled to operate in a single thread (ST) mode or a multithreading (MT) mode. The ST mode consists of a single thread and the MT mode consists of a plurality of threads on shared resources of a respective core. The computer program product includes a computer readable storage medium having program instructions embodied therewith, wherein the computer readable storage medium is not a signal, the program instructions readable by a processing circuit to cause the processing circuit to perform a method. The method includes providing a core-oriented system control area (COSCA) having a common area representing all of the one or more cores of the VM configuration and separate core description areas for each core of the one or more cores in the VM configuration. Each core description area indicates a location of one or more thread description areas each representing a thread within the respective core, and each thread description area indicates a location of a state description of the respective thread. The method also includes managing, by a core, threads of the one or more cores of the VM configuration based on contents of the COSCA.

In addition to one or more of the features described above, or as an alternative, further embodiments can include where the common area further indicates locations of the one or more separate core description areas for the one or more cores.

In addition to one or more of the features described above, or as an alternative, further embodiments can include where the common area further includes a core validity mask that indicates a validity of the one or more cores.

In addition to one or more of the features described above, or as an alternative, further embodiments can include where the core description area further includes a thread validity mask that indicates a validity of one or more threads associated with a core.

In addition to one or more of the features described above, or as an alternative, further embodiments can include where at least one of: each of the core description areas further indicates a location of the common area; each of the state descriptions further indicates a location of a thread description area of the respective thread, each of the thread description areas further indicates a location of a core description area of the respective core, and each of the thread description areas further indicates the location of the common area.

In addition to one or more of the features described above, or as an alternative, further embodiments can include where each of the one or more state descriptions further indicates a location of the common area.

In addition to one or more of the features described above, or as an alternative, further embodiments can include where the common area further indicates locations of the one or more separate core description areas for the one or more cores, the common area further includes a core validity mask that indicates a validity of the one or more cores, and the core description area further includes a thread validity mask that indicates a validity of one or more threads associated with a core.

In addition to one or more of the features described above, or as an alternative, further embodiments can include where the managing includes providing coordination between threads in the VM configuration.

In addition to one or more of the features described above, or as an alternative, further embodiments can include where the managing includes modifying a content of a thread description area.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 14:
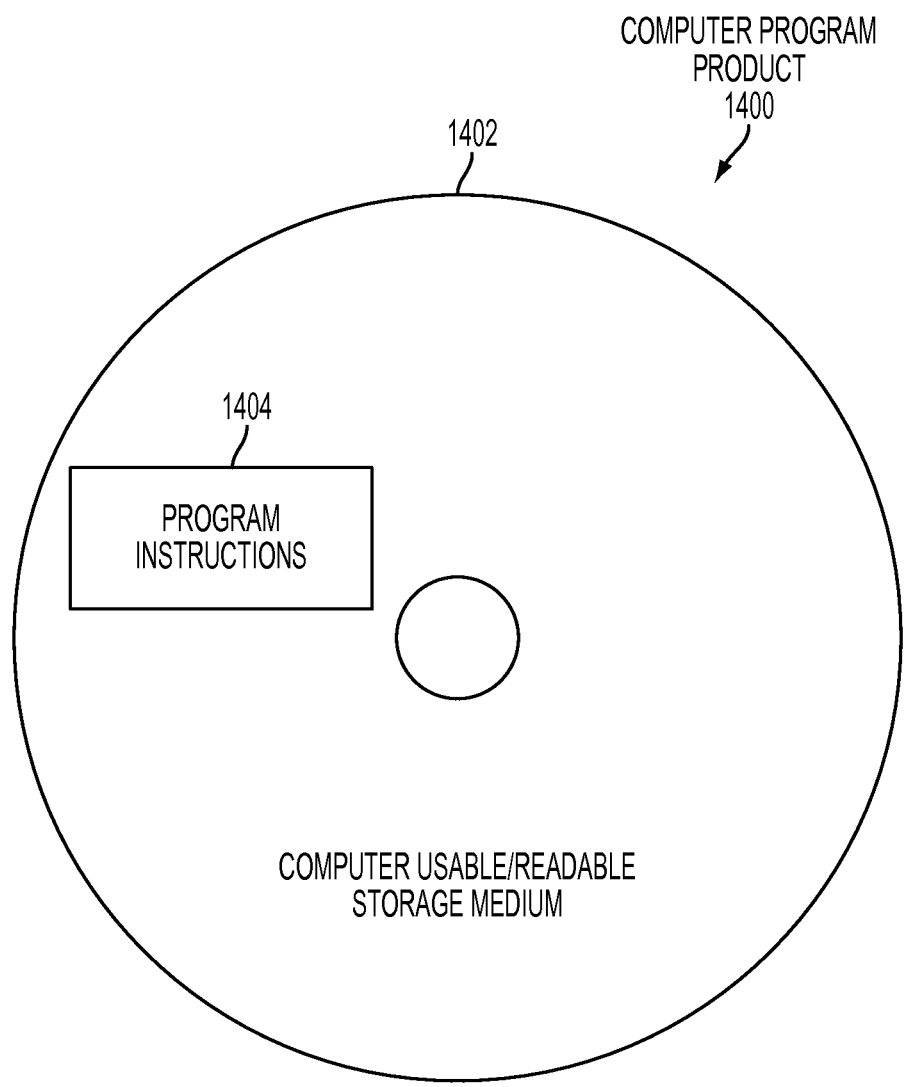
FIG. 14 depicts a computer-readable medium according to an embodiment.

Referring now to FIG. 14, in one example, a computer program product 1400 includes, for instance, one or more storage media 1402, wherein the media may be tangible and/or non-transitory, to store computer readable program code means or logic 1404 thereon to provide and facilitate one or more aspects of embodiments described herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer system, comprising:
a processor in communication with one or more types of memory, the processor configured to:
execute a virtual machine (VM) configuration comprising at least a first logical core and a second logical core, each of the first logical core and the second logical core enabled to operate in a single thread (ST) mode or a multithreading (MT) mode, the ST mode including a single physical thread and the MT mode including a plurality of physical threads on shared resources of one or more physical cores;
execute a core-oriented system control area (COSCA) comprising a common area representing at least the first logical core and the second logical core, the COSCA further comprising a first core description area for the first logical core and a second core description area for the second logical core, the first core description area indicating a location of a first set of one or more thread description areas and the second core description area indicating a location of a second set of one or more thread description areas, wherein each thread description area in the first set contains a state description address indicating a location of a state description of a logical thread in the first logical core and each thread description area in the second set contains a state description address indicating a location of a state description of a logical thread in the second logical core, wherein the COSCA is implemented as a tree structure comprising a first leaf representing the first logical core and a second leaf representing the second logical core, and wherein the first leaf contains a first list of a first set of one or more logical threads in the first logical core and the second leaf contains a second list corresponding to a second set of one or more logical threads in the second logical core;
execute, by a hypervisor configured to control the VM configuration using the COSCA, a first core dispatch instruction to dispatch the first logical core on a physical core, wherein the hypervisor operates in the ST mode and the first core dispatch instruction specifies that the first logical core is to be dispatched in the MT mode;
execute a first logical thread of the first logical core to issue an inter-processor-interrupt instruction to signal a second logical thread of the second logical core;
modify a state description associated with a thread description area in the second set that is associated with the second logical thread to make an inter-processor-interrupt that is associated with the inter-processor-interrupt instruction pending;
execute, by the hypervisor, a second core dispatch instruction to dispatch the second logical core on the physical core;
enable the second logical core for the inter-processor-interrupt; and
present the inter-processor-interrupt to the first logical core.

2. The computer system of claim 1, wherein the common area further includes a core validity mask that indicates a validity of each of the first logical core and the second logical core.

3. The computer system of claim 1, wherein the first core description area further includes a thread validity mask that indicates a validity of one or more logical threads in the first logical core.

4. The computer system of claim 1, wherein each state description further indicates a location of the common area.

5. A computer-implemented method for managing multiple threads in a virtual machine (VM) configuration, the method comprising:
providing, the VM configuration comprising at least a first logical core and a second logical core, each of the first logical core and the second logical core enabled to operate in a single thread (ST) mode or a multithreading (MT) mode, the ST mode including a single physical thread and the MT mode including a plurality of physical threads on shared resources of one or more physical cores;
providing a core-oriented system control area (COSCA) comprising a common area representing at least the first logical core and the second logical core, the COSCA further comprising a first core description area for the first logical core and a second core description area for the second logical core, the first core description area indicating a location of a first set of one or more thread description areas and the second core description area indicating a location of a second set of one or more thread description areas, wherein each thread description area in the first set contains a state description address indicating a location of a state description of a logical thread in the first logical core and each thread description area in the second set contains a state description address indicating a location of a state description of a logical thread in the second logical core, wherein the COSCA is implemented as a tree structure comprising a first leaf representing the first logical core and a second leaf representing the second logical core, and wherein the first leaf contains a first list of a first set of one or more logical threads in the first logical core and the second leaf contains a second list corresponding to a second set of one or more logical threads in the second logical core;

executing, by a hypervisor configured to control the VM configuration using the COSCA, a first core dispatch instruction to dispatch the first logical core on a physical core, wherein the hypervisor operates in the ST mode and the first core dispatch instruction specifies that the first logical core is to be dispatched in the MT mode;

executing a first logical thread of the first logical core to issue an inter-processor-interrupt instruction to signal a second logical thread of the second logical core;

modifying a state description associated with a thread description area in the second set that is associated with the second logical thread to make an inter-processor-interrupt that is associated with the inter-processor-interrupt instruction pending;

executing, by the hypervisor, a second core dispatch instruction to dispatch the second logical core on the physical core;

enabling the second logical core for the inter-processor-interrupt; and present the inter-processor-interrupt to the first logical core.

6. The method of claim 5, wherein the common area further includes a core validity mask that indicates a validity of each of the first logical core and the second logical core.

7. The method of claim 5, wherein the first core description area further includes a thread validity mask that indicates a validity of one or more logical threads in the first logical core.

8. A computer program product comprising a non-transitory storage medium readable by a processing circuit and storing instructions for execution by the processing circuit for performing a method comprising:

providing a virtual machine (VM) configuration comprising at least a first logical core and a second logical core, each of the first logical core and the second logical core enabled to operate in a single thread (ST) mode or a multithreading (MT) mode, the ST mode including a single physical thread and the MT mode including a plurality of physical threads on shared resources of one or more physical cores;

providing a core-oriented system control area (COSCA) comprising a common area representing at least the first logical core and the second logical core, the COSCA further comprising a first core description area for the first logical core and a second core description area for the second logical core, the first core description area indicating a location of a first set of one or more thread description areas and the second core description area indicating a location of a second set of one or more thread description areas, wherein each thread description area in the first set contains a state description address indicating a location of a state description of a logical thread in the first logical core and each thread description area in the second set contains a state description address indicating a location of a state description of a logical thread in the second logical core, wherein the COSCA is implemented as a tree structure comprising a first leaf representing the first logical core and a second leaf representing the second logical core, and wherein the first leaf contains a first list of a first set of one or more logical threads in the first logical core and the second leaf contains a second list corresponding to a second set of one or more logical threads in the second logical core;

executing, by a hypervisor configured to control the VM configuration using the COSCA, a first core dispatch instruction to dispatch the first logical core on a physical core, wherein the hypervisor operates in the ST mode and the first core dispatch instruction specifies that the first logical core is to be dispatched in the MT mode;

executing a first logical thread of the first logical core to issue an inter-processor-interrupt instruction to signal a second logical thread of the second logical core;

modifying a state description associated with a thread description area in the second set that is associated with the second logical thread to make an inter-processor-inter pt that, is associated with the inter-processor interrupt pending;

executing, by the hypervisor, a second core dispatch instruction to dispatch the second logical core on the physical core;

enabling the second logical core for the inter-processor-interrupt; and present the inter-processor interrupt to the first logical score.

9. The computer program product of claim 8, wherein the common area further includes a core validity mask that indicates a validity of each of the first logical core and the second logical core.

10. The computer program product of claim 8, wherein the first core description area further includes a thread validity mask that indicates a validity of one or more logical threads in the first logical core.

* * * * *